April 5, 1932.  F. H. RAGAN  1,852,997

BRAKE MECHANISM

Original Filed Feb. 12, 1924   4 Sheets-Sheet 1

INVENTOR
Frederick H. Ragan
BY Fay, Oberlin & Fay
ATTORNEYS.

April 5, 1932. F. H. RAGAN 1,852,997
BRAKE MECHANISM
Original Filed Feb. 12, 1924 4 Sheets-Sheet 2
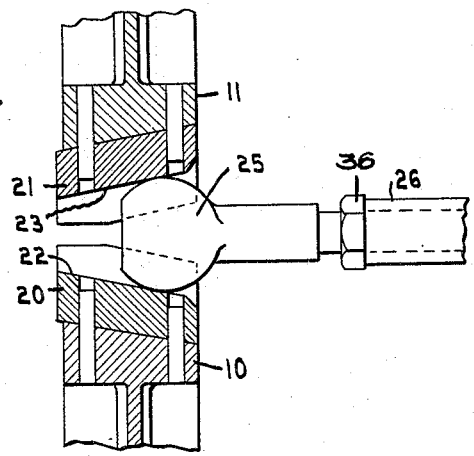
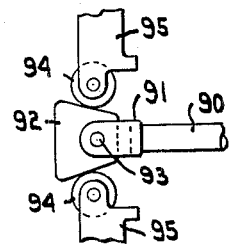
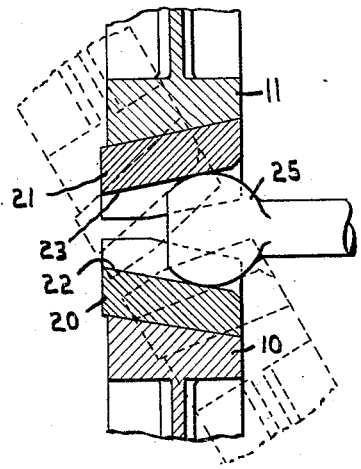
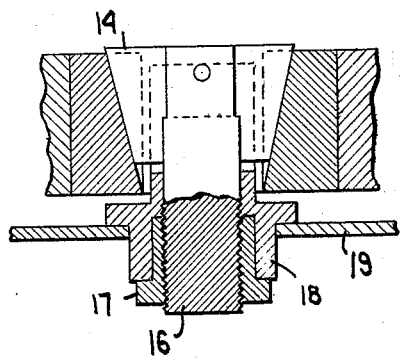
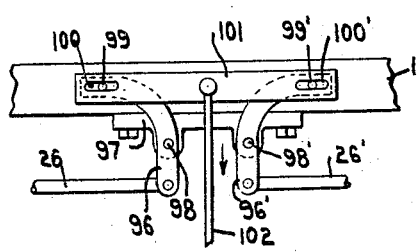
INVENTOR.
Frederick H. Ragan
BY Fay, Oberlin & Fay
ATTORNEYS.

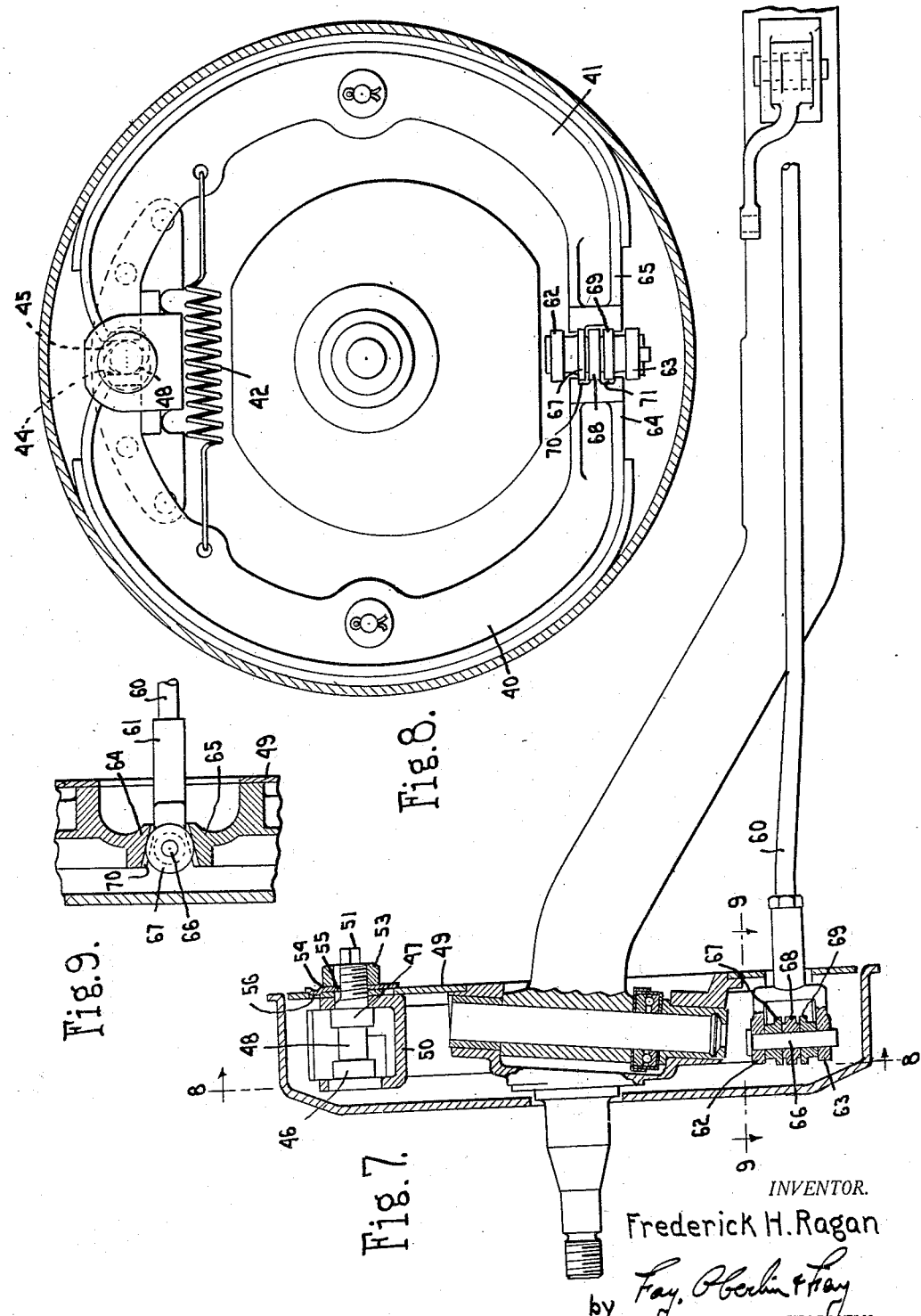

April 5, 1932.　　　F. H. RAGAN　　　1,852,997
BRAKE MECHANISM
Original Filed Feb. 12, 1924　　4 Sheets-Sheet 4

INVENTOR.
Frederick H. Ragan
BY
ATTORNEYS.

Patented Apr. 5, 1932

1,852,997

UNITED STATES PATENT OFFICE

FREDERICK H. RAGAN, OF SHAKER HEIGHTS, OHIO, ASSIGNOR TO THE COLUMBIA AXLE COMPANY, OF CLEVELAND, OHIO, A CORPORATION OF OHIO

BRAKE MECHANISM

Original application filed February 12, 1924, Serial No. 692,302. Divided and this application filed October 18, 1926. Serial No. 142,208.

The present invention, relating, as indicated, to brake mechanism, is more particularly directed to brake mechanism for use in connection with motor vehicle braking systems in which brakes are applied to four-wheels, including the steering wheels, which are mounted to oscillate about substantially vertical axes. The principal object of the invention is the provision of a simple, inexpensive brake system of the type which can be economically manufactured. The present application is a division of my co-pending application Serial No. 692,302, filed February 12, 1924, which has matured into Patent No. 1,603,405, October 19, 1926.

To the accomplishment of the foregoing and related ends, said invention, then, consists of the means hereinafter fully described and particularly pointed out in the claims; the annexed drawings and the following description setting forth in detail certain mechanism embodying the invention, such disclosed means constituting, however, but one of various mechanical forms in which the principle of the invention may be used.

In said annexed drawings:—

Figure 1:
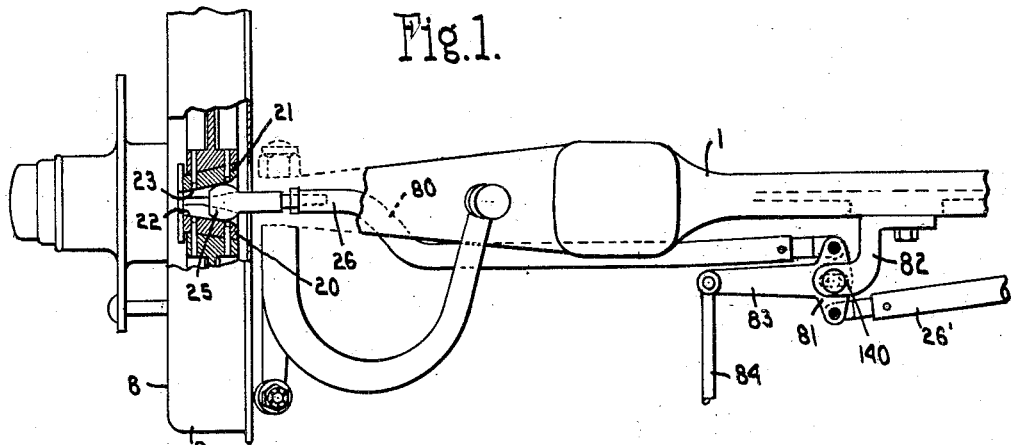
Figure 2:
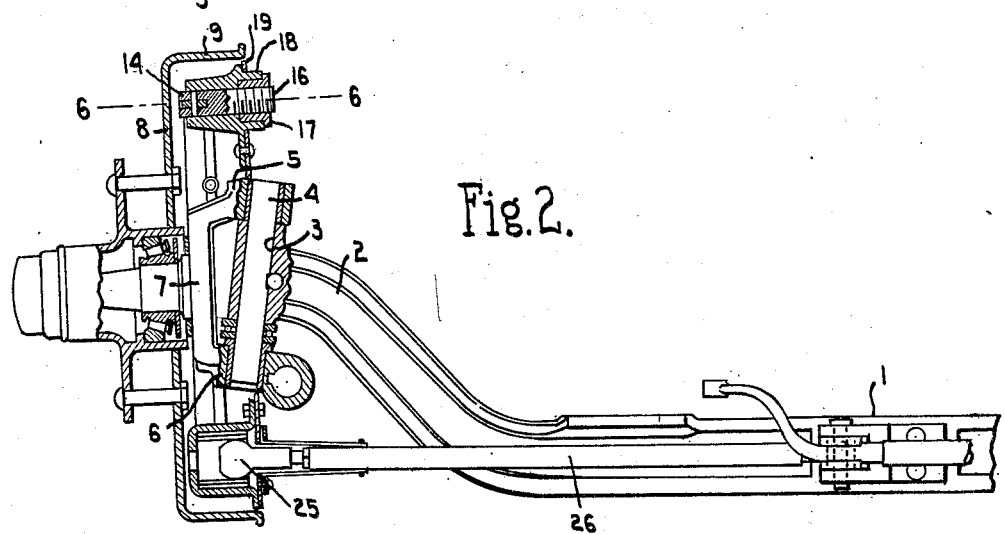
Figure 3:
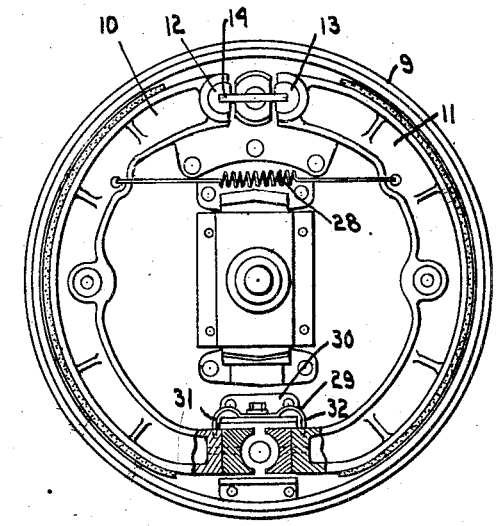
Figure 12:
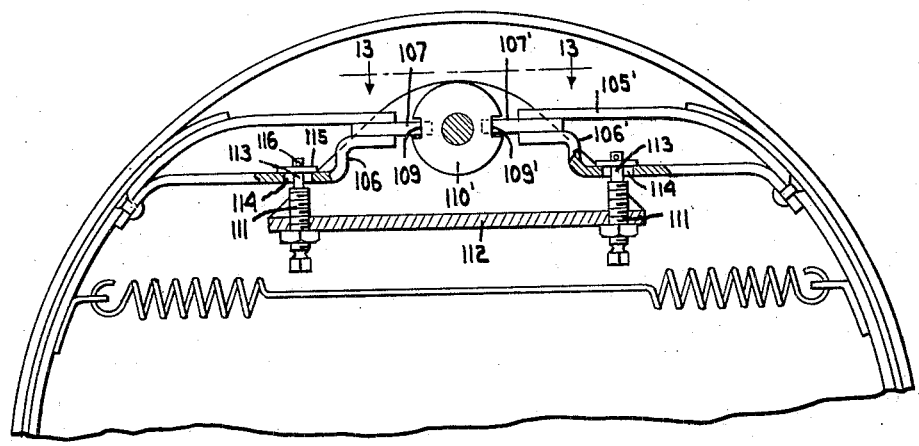
Figure 13:
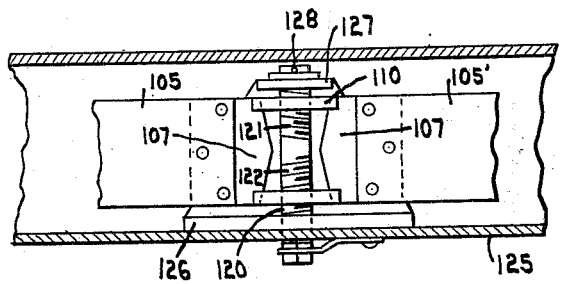

Fig. 1 is a plan view showing one portion of a front axle of a vehicle, together with the brake mechanism therefor, the brake mechanism being partially in section; Fig. 2 is a front elevation of the same showing brake mechanism and end of the axle in section; Fig. 3 is a front elevation of the brake drum and shoes and means for operating the same; Fig. 4 is a horizontal section with the brake operating means, this view being an enlargement of the view of the brake mechanism shown in Fig. 1; Fig. 5 is a view similar to Fig. 4, but showing the relation of the shoes and operating means in a different angular position of the former; Fig. 6 is a section on the line 6—6 in Fig. 2; Fig. 7 is a view similar to Fig. 2, but showing a modification of the operating means there shown; Fig. 8 is a front elevation of the brake mechanism shown in Fig. 7; Fig. 9 is a horizontal section on the line 9—9, Fig. 7; Fig. 10 is a plan view of a modification of the brake operating member; Fig. 11 is a plan view of a modification of my equalizing means; Fig. 12 is an end elevation showing a modified type of brake shoe construction and mounting therefor; and Fig. 13 is a section on the line 13—13, Fig. 12, showing the means for adjusting the normal position of the brake shoes.

Referring now to Figs. 1, 2 and 3 there is shown an axle member 1 which represents the front axle of a motor vehicle, this member being provided with the usual offset end portion 2 formed with an opening 3 therethrough at a slight angle to a vertical plane. In this opening 3 there is mounted a pivot member or king pin 4, which is rotatably received within aligned openings formed in the spaced ends 5 and 6 of the wheel spindle member 7. Upon the wheel spindle there is mounted a wheel (not shown), and on such wheel a brake drum 8 provided with the usual flange 9. The axle as so far described is of the usual construction.

The brake members and the means for operating the same are shown in Fig. 3. The brake members consist of two semi-circular shoes 10 and 11, which are provided with angularly formed ends in which are oscillatorily mounted pins 12 and 13. These pins are slotted and are engaged in such slots by means of a ring member or plate 14, which is shown in section in Fig. 6, and which may be moved transversely of the plane of the shoes by means of a bolt 16 and nut 17 thereon to adjust the spacing between the ends of the brake shoes, this bolt 16 being received in an anchor bracket 18, which is fixed in the dust cap 19 carried on the spindle. It will be evident that upon spreading the other ends of the two brake shoes the latter will rock about the pins 12 and 13 and move into engagement with the flange 9 on the drum the shoes being provided with suitable friction material on their outer surfaces to provide a braking action against the drum.

The means for actuating the brake shoes are shown in Figs. 1, 2, 4 and 5, while a modified type of actuating means is shown in Figs. 7, 8 and 9. In the first form, in Figs. 1, 2 and 3, the adjacent lower ends of the brake shoes 10 and 11 are provided with wear plates 20 and 21, having beveled or converging adjacent surfaces 22 and 23, and being of cylindrical outline. These surfaces are engaged by means of a ball-shaped member 25 adjustably connected to a rod 26 which is movable substantially longitudinally of the axle member 1. When the member 25 is moved outwardly, that is toward the outer portion of the wheel the spherical surface of the faced-off ball 25 wedges apart the lower ends of the shoes 10 and 11 and forces the same into engagement with the drum. When the wheel is oscillated about its axis, which is the center line of the pin 4, the ball remains in contact with the two wear plates on the lower ends of the shoes, the position of which is that shown in dotted lines in Fig. 5. Upon movement of the rod 26 the ball will then act as before to spread the two shoes apart and engage both of them with the brake drum. Upon the release of the rod 20 the shoes are returned to their normal position by means of a coil spring 28 and a bolt-shaped flat spring 29 mounted on a plate 30 secured to the dust plate or cover 19. This spring 29 has two curved ends 31 and 32 engaging in suitable slots in the lower ends of the brake shoes, as shown in Fig. 3.

In Figs. 7, 8 and 9 I have shown a modification of the above means, in which the brake shoes consist of two semi-circular members 40 and 41, normally held in the position shown in Fig. 8, that is, out of engagement with the brake drum by means of a tension spring 42. These two shoes 40 and 41 have their upper adjacent ends formed with parallel substantially radial flanges 44 and 45 contacting against two cams or eccentrics 46 and 47, respectively. The two cams are connected by a shaft or stud 48 extending through the dust plate 49 of the brake drum, and being firmly mounted in an anchor brake 50 at either end. One of the cams extends to one side of the central plane of the shaft 48 and engages the flange 44 of the shoe 40, and the other cam extends in the opposite direction and engages against the flanges 45 on the shoe 41. Rotation of the shaft 48, which may be effected by rotating the square end 51 of the bolt, will space apart the two ends 44 and 45 of the two shoes. Rotation of the shaft 48 may be effected after a nut 53 has first been moved sufficiently to allow a washer 54, provided with a projection 55, to be swung out of its engagement with one of the openings 56 formed in a circumferential series in the dust cap. When the desired adjustment has been made, the washer 54 is allowed to snap back into the nearest recess 55, and the nut 53 is then turned down to hold the bolt and cams in the desired position.

The means for operating the shoes of the present construction consist of a longitudinally movable rod 60 adjustably connected to a socket 61, which is formed with two yoked arms 62 and 63 positioned between the adjacent lower ends 64 and 65 of the shoes. Vertically disposed in the two arms 62 and 63, is a stud 66, upon which are rotatably mounted rollers 67, 68 and 69. These rollers engage in corresponding recesses in the ends of the wear plates 70 and 71, secured respectively to the ends of the shoes 40 and 41. The operation of the above described brake actuating means is similar to the operation previously described and shown in Figs. 1 and 6.

In both types of my construction the longitudinally movable rod 26 (see Figs. 1 and 2) is provided with an offset portion 80, allowing the inner portion of the rod to lie in a plane behind the vertical plane of the axle 1. At its inner end the rod 26 (or the rod 60 in the form of Fig. 7) is connected to one end of a lever 81, which is pivoted about a vertical axis in a bracket 82 mounted on the axle. On the other end of this link 81 there is correspondingly attached a second rod 26' extending to the brakes in the other wheel. The plate 81 is also provided with an arm 83, to which is attached a rod 84, which may be carried to the brake foot pedal, so that longitudinal movement of the rod 84 will rock the plate 81 and move the levers 26 and 26' in opposite directions to apply the brake shoes in either wheel. The lever 81 has a slot 140 extending in a plane parallel to rods 26, 26', which allows slight longitudinal movement of the lever to equalize the pull on the two rods.

Adjustment for wear between the wear plates on the lower ends of the brake shoes, and either the ball or roller operating members of the two types shown, can be readily effected by releasing the nut 36 on the end of the rod 26, and then securing the end of the ball member 25 outwardly a sufficient distance. The same adjustment may be made in the construction of Fig. 7, except that here the adjustment is made by detaching the inner end of the rod 60 from its connection to the plate 81, and then turning this rod while leaving the socket and yoke 61 in their original angular position. The present brake mechanism is extremely simple in its construction, and has the particular advantage of not requiring close limits between the various ports, since the adjustments provided can be utilized to take up for the usual manufacturing tolerances in the final assembly of the mechanism without affecting in any way the even and uniform application of the brake mechanism.

In Fig. 10 I have shown a modification of the brake actuating means, here shown to consist of a longitudinally movable bar or rod 90, having a forked end 91, between the two parts of which is pivotally mounted a pressed steel wedge member 92. This wedge member 92 may be economically formed out of sheet metal and may be readily mounted on the end of the rod 91 by means of a pin 93. It operates against rollers 94 carried in the ends of the brake shoes 95, and when worn can be conveniently replaced.

In Fig. 11 I have shown a modification of the equalizing means. In this form the two brake actuating members 26 and 26' are connected at their inner or adjacent ends to the outer ends of levers 96 and 96', which are oscillatorily mounted on a bracket 97 about pins 98 and 98'. The other ends of the two levers 96 and 96' are provided with pins 99 and 99' which are received in slots 100 and 100' in a connecting bar 101 mounted directly over the axle 1. A rod 102 is connected to the center of the transverse bar 101, and movement of the rod 102 in the direction of the arrow causes oscillation of the lever 96 in a counterclockwise direction, and of the lever 96' in a clockwise direction, thus drawing the rod 26 and 26' together and applying the brakes. Any inequalities in the application of the pressure are equalized through the floating connection between the two levers 96 and 96' and the bar 101.

The direction of movement of the rod 102 depends upon whether the equalizing mechanism for operating the longitudinally movable rods is employed with end members of the type shown in Figs. 1 to 5, inclusive, or of the type shown in Figs. 7 to 10, inclusive. If employed with the end members shown in Figs. 1 to 5, inclusive, which includes the ball end 25, then the rod 102 is pulled in a direction corresponding to the upward direction on the drawing in Fig. 1. If the mechanism shown in Figs. 7, 8, 9 and 10 is employed the rod 102 must be pushed downwardly (as shown on the drawing Fig. 1) to effect operation of the rods 26, 26'.

In Figs. 12 and 13 I have shown a modified type of brake shoe, in which the inner ends of the brake shoe members 105, 105' are provided with spaced plates 106, 106'. Between the adjacent ends of the plates 105 and 106 and 105' and 106' are secured short plates 107, 107' which are loosely supported in recesses 109 and 109' formed in two spaced parallel disks 110 and 110', (see Fig. 13). The initial or inoperative position of the brake shoe in this construction may be adjusted by means of an adjusting screw 111 carried in a bracket 112, which is secured to the dust plate or spindle. This screw is provided with a reduced end portion 113, which is received in a slot 114, in the plate 106. A washer 115 and retaining pin 116 prevent disengagement of the adjusting screw from the slot, while the size of the slot permits lateral movement of the shoe with respect to the adjusting pin.

The action of the shoes when so mounted is to pivot about the pin 111 which will produce a slight bend in the member 105 because of the mounting of the plate 107, which is secured thereto in the narrow slot 109 in the disk, but the end portion of the members 105 and 106 is sufficiently flexible to allow for the slight bending which is required when the shoes are moved outwardly into engagement.

The initial adjustment between the ends of the two shoes is effected by the mechanism shown in Fig. 13. This mechanism includes a screw or bolt 120 having right and left-hand threaded portions 121 and 122 respectively engaging with the adjusting disks 110 and 110'. The plates 107, which engage in the slots 109 and 109' in the disks are beveled as indicated in this figure, so that any rotation of the bolt 120 which will bring the two disks nearer together will force apart the two plates 107 and also of course the two shoes 105 and 105'. The slots 114 are of sufficient length to permit of adjustment of the initial position of the shoes to take up for wear on the brake bands without bringing the adjusting screws 111 into contact with the ends of the slot. The bolt 120 is supported in the dust plate 125, which is reinforced by a bracket plate 126 which is provided with a flange 127, through which the other end of the bolt passes and where it is retained against disengagement by means of a pin 128.

The adjusting means just described have the advantage of being extremely simple in the parts of which they are composed, all of these parts being either inexpensive screw machine products or stampings, while the mounting thus given to the shoes permits the latter to be brought into extremely effective breaking engagement with the drum throughout practically the entire length of each shoe and without requiring the mounting of the shoes on mechanism which will permit of a bodily floating of the shoes into engagement with the drum. When applied, one of the shoes is anchored against the operating mechanism previously described, while the other shoe anchors itself against the disks 110 and 110'.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In mechanism of the character described, the combination of a brake drum, two shoes mounted adjacent the periphery of said drum, actuating means disposed between adjacent ends of said shoes for moving the same into engagement with said drum, adjusting means disposed between the other adjacent ends of said shoes, said means including pair of spaced non-rotatable elements having converging surfaces slidably engaging said shoes, and means adjustably connecting said elements.

2. In mechanism of the character described, the combination of a brake drum, two shoes mounted adjacent the periphery of said drum, actuating means disposed between adjacent ends of said shoes for moving the same into engagement with said drum, adjusting means disposed between the other adjacent ends of said shoes, said adjusting means including spaced non-rotatable elements having converging surfaces, and said adjusting means having a slidable engagement with said shoes, and a right and left screw adjustably engaging said elements.

3. A brake comprising, in combination, shoes having oppositely-inclined wedge surfaces at adjacent ends, two pairs of opposite wedge members having surfaces engaging the oppositely-inclined surfaces, and a right-and-left threaded member for adjusting the four wedge members simultaneously.

Signed by me this 16th day of October, 1926.

FREDERICK H. RAGAN.